(12) United States Patent
Sharp, Jr.

(10) Patent No.: US 10,262,295 B2
(45) Date of Patent: Apr. 16, 2019

(54) WIRELESS REMOTE MONITORING OF SUPPLY BINS

(71) Applicant: William L. Sharp, Jr., Clarkston, MI (US)

(72) Inventor: William L. Sharp, Jr., Clarkston, MI (US)

(*) Notice: Subject to any disclaimer, the term of this patent is extended or adjusted under 35 U.S.C. 154(b) by 0 days.

(21) Appl. No.: 15/605,113

(22) Filed: May 25, 2017

(65) Prior Publication Data
US 2017/0344936 A1 Nov. 30, 2017

Related U.S. Application Data

(60) Provisional application No. 62/341,825, filed on May 26, 2016.

(51) Int. Cl.
G06K 7/10 (2006.01)
G06Q 10/08 (2012.01)
G06Q 50/28 (2012.01)

(52) U.S. Cl.
CPC ....... *G06Q 10/087* (2013.01); *G06K 7/10297* (2013.01); *G06Q 50/28* (2013.01)

(58) Field of Classification Search
CPC .................................................. G06Q 7/10297
USPC ................ 235/385, 383, 382; 705/2, 23, 28; 340/539.1, 572.1
See application file for complete search history.

(56) References Cited

U.S. PATENT DOCUMENTS

| 7,586,385 | B2 | 9/2009 | Rokhsaz |
| 8,081,043 | B2 | 12/2011 | Rokhsaz |
| 8,113,424 | B2 | 2/2012 | Philippe |
| 8,461,962 | B2 | 6/2013 | Philippe |
| 8,749,319 | B2 | 6/2014 | Rokhsaz et al. |
| 9,048,819 | B2 | 6/2015 | Rokhsaz et al. |
| 9,582,981 | B2 | 2/2017 | Rokhsaz et al. |
| 9,607,188 | B2 | 3/2017 | Rokhsaz et al. |
| 2006/0071774 | A1 | 4/2006 | Brown et al. |
| 2007/0050271 | A1 | 3/2007 | Ufford et al. |
| 2008/0012687 | A1 | 1/2008 | Rubinstein |
| 2008/0116990 | A1 | 5/2008 | Rokhsaz |
| 2008/0157967 | A1 | 7/2008 | Jones et al. |

(Continued)

FOREIGN PATENT DOCUMENTS

| WO | 2015184460 | 12/2015 |
| WO | 2016060938 | 4/2016 |

OTHER PUBLICATIONS

International Search Report for International Application No. PCT/US2017/034455 completed Jul. 13, 2017.

*Primary Examiner* — Allyson N Trail
(74) *Attorney, Agent, or Firm* — Carlson, Gaskey & Olds, P.C.

(57) ABSTRACT

A provisioning system includes a plurality of supply bins each having a bottom wall and a peripheral wall extending upward from the bottom wall to define a bin interior. A sensor module is disposed in each bin interior. The sensor module includes an RF interface capable of providing wireless communication and a sensor capable of detecting items in the bin interior and communicating via the RF interface based upon a quantity of the items detected by the sensor in the bin interior. An RF reader reads all of the RF interfaces in the supply bins in a supply room to determine what items need to be resupplied.

24 Claims, 4 Drawing Sheets

(56) References Cited

U.S. PATENT DOCUMENTS

| | | | |
|---|---|---|---|
| 2009/0114041 A1* | 5/2009 | Harish | G06Q 10/087 73/862.626 |
| 2009/0125406 A1* | 5/2009 | Lewis | G06Q 20/208 705/23 |
| 2009/0160648 A1 | 6/2009 | Rokhsaz | |
| 2009/0289743 A1 | 11/2009 | Rokhsaz | |
| 2011/0025458 A1 | 2/2011 | Rokhsaz et al. | |
| 2011/0025473 A1 | 2/2011 | Rokhsaz et al. | |
| 2011/0152844 A1* | 6/2011 | Charles | A61B 50/10 606/1 |
| 2011/0291810 A1 | 12/2011 | Rokhsaz et al. | |
| 2011/0300808 A1 | 12/2011 | Rokhsaz et al. | |
| 2012/0217311 A1 | 8/2012 | Rokhsaz et al. | |
| 2012/0296751 A1* | 11/2012 | Napper | G06Q 20/208 705/23 |
| 2014/0001258 A1* | 1/2014 | Chan | G06Q 10/0875 235/385 |
| 2014/0120836 A1 | 5/2014 | Rokhsaz et al. | |
| 2015/0057939 A1* | 2/2015 | Baym | G06F 19/704 702/19 |
| 2016/0025553 A1* | 1/2016 | Baumgartel | B60Q 1/04 315/82 |
| 2016/0171903 A1* | 6/2016 | Grossman | G06T 19/006 434/238 |
| 2016/0188927 A1 | 6/2016 | Rokhsaz et al. | |
| 2016/0198388 A1 | 7/2016 | Greene et al. | |
| 2016/0205722 A1 | 7/2016 | Greene | |
| 2016/0257173 A1 | 9/2016 | Young et al. | |
| 2016/0267769 A1 | 9/2016 | Rokhsaz et al. | |
| 2016/0328584 A1 | 11/2016 | Rokhsaz et al. | |
| 2016/0337789 A1 | 11/2016 | Rokhsaz | |
| 2016/0352214 A1 | 12/2016 | Young et al. | |
| 2016/0373020 A1 | 12/2016 | Paulos et al. | |
| 2017/0013483 A1 | 1/2017 | Rokhsaz | |
| 2017/0027043 A1 | 1/2017 | Greene et al. | |
| 2017/0053071 A1* | 2/2017 | Caputo | G06F 19/323 |
| 2017/0057305 A1 | 3/2017 | Rokhsaz et al. | |
| 2017/0077761 A1 | 3/2017 | Younis et al. | |
| 2017/0083805 A1 | 3/2017 | Rokhsaz et al. | |
| 2017/0108370 A1* | 4/2017 | Pyne | G01G 19/42 |
| 2017/0110796 A1 | 4/2017 | Rokhsaz et al. | |
| 2017/0131222 A1 | 5/2017 | Zalbide Agirrezabalaga et al. | |
| 2017/0132560 A1* | 5/2017 | Jones | G06Q 10/087 |

\* cited by examiner

WIRELESS REMOTE MONITORING OF SUPPLY BINS

BACKGROUND

Some known provisioning systems, such as supply rooms for hospitals, use a two-bin system. Like supplies are stored in two bins. When one bin is empty, a user takes a card from the empty bin and places it on a provisioning board. In the meantime, supplies are drawn from the second bin. Periodically, the provisioning board is checked to see what supplies need to be replenished. This can be done manually or via RF tags in the cards.

Even with the RF tags, the known system still relies on human action to indicate that one of the bins is empty. If this is not done promptly, the second bin may run out of supplies before the bins can be re-provisioned. Other known systems use three or more bins, but have the same reliance on human action to indicate that one or more of the bins is empty.

SUMMARY

A provisioning system includes a plurality of supply bins. A sensor module is disposed in each bin interior. The sensor module includes an RF interface capable of providing wireless communication and a sensor capable of detecting items in the bin interior. The sensor communicates via the RF interface based upon a quantity of the items detected by the sensor in the bin interior. For example, the sensor may detect when the bin is empty or nearly empty. An RF reader reads all of the RF interfaces in the supply bins in a supply room or in a cabinet to determine what items need to be resupplied.

DETAILED DESCRIPTION OF PREFERRED EMBODIMENTS

Figure 1:
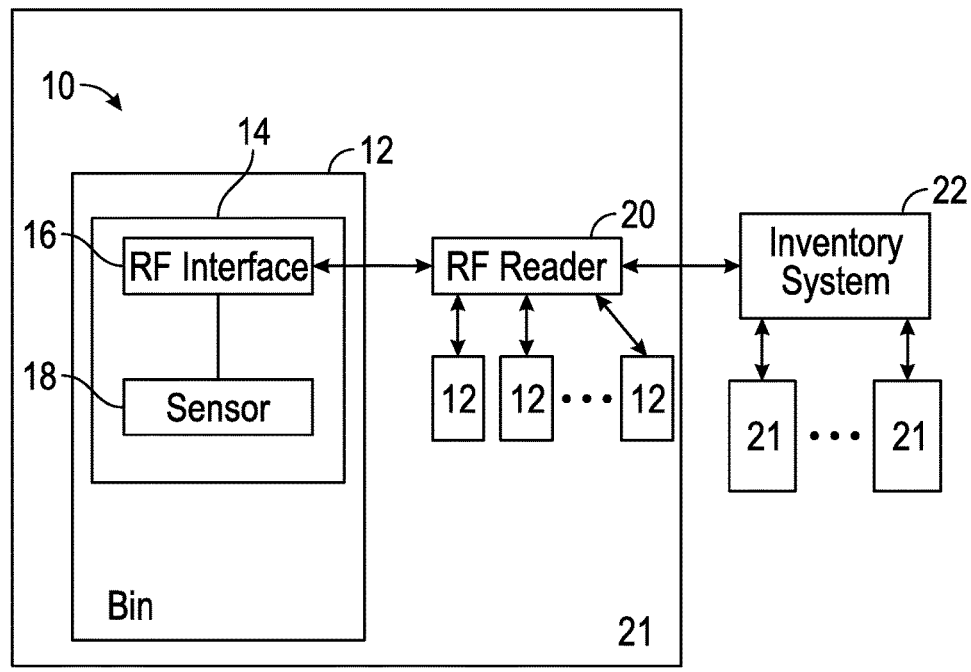
FIG. 1 is a schematic of a provisioning system according to one embodiment.

A schematic of a provisioning system 10 according to one embodiment is shown in FIG. 1. The provisioning system 10 includes a plurality of bins 12 in a supply room 21. The bins 12 may be many different sizes. A sensor module 14 is installed in each bin 12 (although only illustrated in one bin 12 for clarity). The sensor module 14 is preferably a passive RFID tag. The sensor module 14 includes an RF interface 16 which provides wireless communication. The sensor module 14 further includes a sensor 18 in communication with the RF interface 16.

The system 10 further includes at least one RF reader 20 for reading the RF interface 16 to obtain a measured value from the sensor 18. The RF reader 20 is installed in the supply room 21 (or in cabinets in the supply room 21), each within range of the RF interfaces 16 in the bins 12. The system 10 may include a plurality of supply rooms 21, each having a plurality of bins 12 and each bin 12 having a sensor module 14. A single RF reader 20 preferably interrogates a plurality of sensor modules 14 within each supply room; however, more than one RF reader 20 may be utilized in a single supply room 21 (for example, one RF reader 20 for each cabinet or set of shelves in a supply room 21).

All of the RF readers 20 report back to an inventory system 22, which is a computer hosting inventory and replenishment management software. As will be explained further below, the sensor module 14 detects when the bin 12 is empty (or nearly so) and reports the empty bin 12 when interrogated by the RF reader 20. From that point on, the system 10 operates the same as existing bin based systems. As is known from the existing systems, an empty bin 12 is a triggering event for replenishment (the additional bin(s) are used during the time between the indication of the empty bin and the replenishment of the bin). Therefore, the sensor module 14 only needs to detect when the bin 12 is completely empty, but it would be acceptable if the sensor module 14 were to report an empty bin 12 when it was only nearly empty. Thus, absolute precision is not required, although detection should err toward being early rather than not at all.

Optionally, depending on the type of items 50 in the bin 12 and the type of sensor 18 in the sensor module 14, it will be possible for the sensor module 14 to estimate the number of items 50 remaining in the bin 12. In this case, those supplies could be stored in a single bin 12 and when the sensor module 14 sends the inventory system 22 an estimate of the number of items 50 remaining that is below a threshold (e.g. approximately half of the starting number of items 50), the inventory system 22 initiates a replenishment of that bin 12 of supplies 50.

Figure 2:
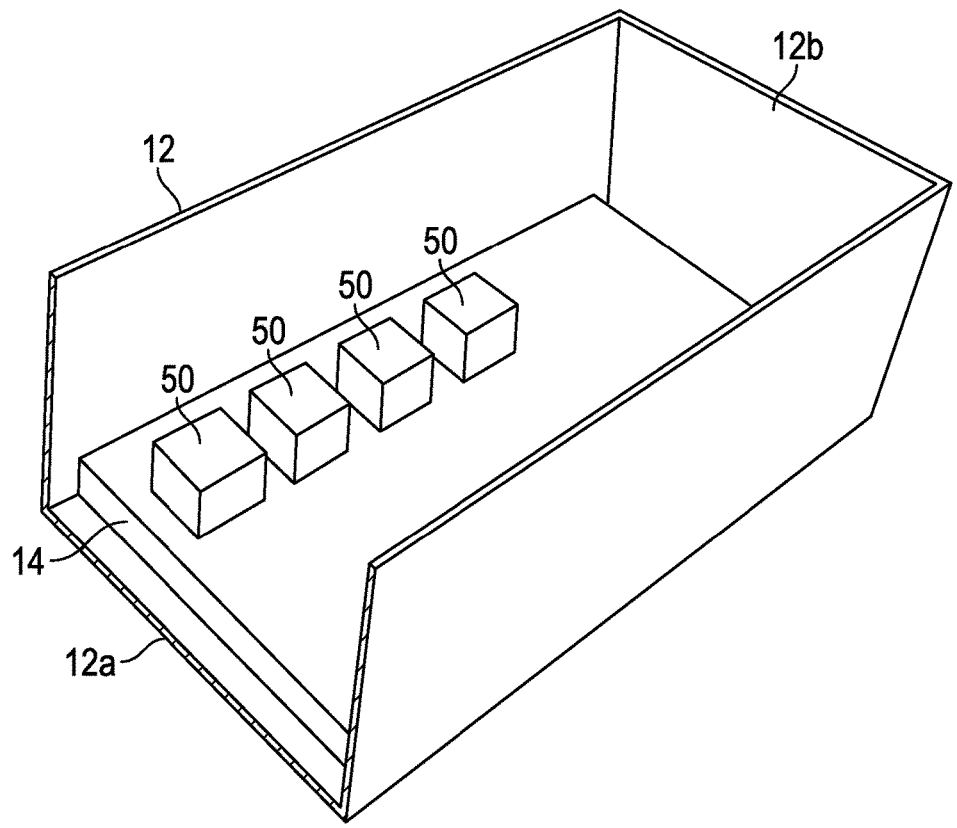
FIG. 2 shows one of the bins of FIG. 1.

FIG. 2 is a schematic side view (not to scale) of one of the bins 12. The bin 12 includes a bottom wall 12a and a peripheral wall 12b extending upward from the perimeter of the bottom wall 12a. The bottom wall 12a may be rectangular, round or other shapes of known bins. The bottom wall 12a and peripheral wall 12b may be integrally molded as a single piece of plastic. As shown, the sensor module 14 may be positioned on the upper surface of the bottom wall 12a of the bin 12. The presence of the items 50 in the bin 12 is detected by the sensor module 14. Again, it is sufficient if the sensor module 14 simply detects the presence or absence of any items 50 (i.e. completely empty vs not completely empty (or at least one remaining)) when interrogated by the RF reader 20.

The sensor 18 of the sensor module 14 may be any one of several types, depending upon the intended contents of the bin 12. For example, the sensor 18 may be a simple contact switch or pressure switch. As another example, the sensor 18 may be optical, and may include photovoltaic cells that detect ambient light or another light source that would be blocked by the presence of inventory in the bin 12. As another example, the sensor 18 may be capacitive, which could be used for some types of objects in the bin 12, depending on the objects' conductivity or dielectric. In addition, the sensor 18 could be acoustic that detects sound reflected from objects in the bin or magnetic and detects the presence of metal. The RFID controller and antenna may be similar in structure and principle to those in RFID tags or RFID sensor modules available from RFMicron, Farsens and Powercast.

As is known, the controller 26 in a passive RFID is powered by energy received by the antenna 24 from the RFID reader 20 and modulates the RF waves from the RFID reader 20 to send information to the RFID reader 20. The information sent to the RFID reader 20 includes a RFID tag number associated with the particular bin 12 and information from the sensor module 14, such as presence/absence of items 50 relative to a threshold, which may or may not be zero, and as indicated does not need to be precise (i.e. it could detect "empty" early). The inventory system 22 includes a database correlating the tag number to the particular bin 12 in a particular supply room 21 and correlating the particular supply items 50 that are supposed to be kept in that particular bin 12, so that the right items 50 can be delivered to the right bin 12 in the right supply room 21 when needed.

Figure 3:
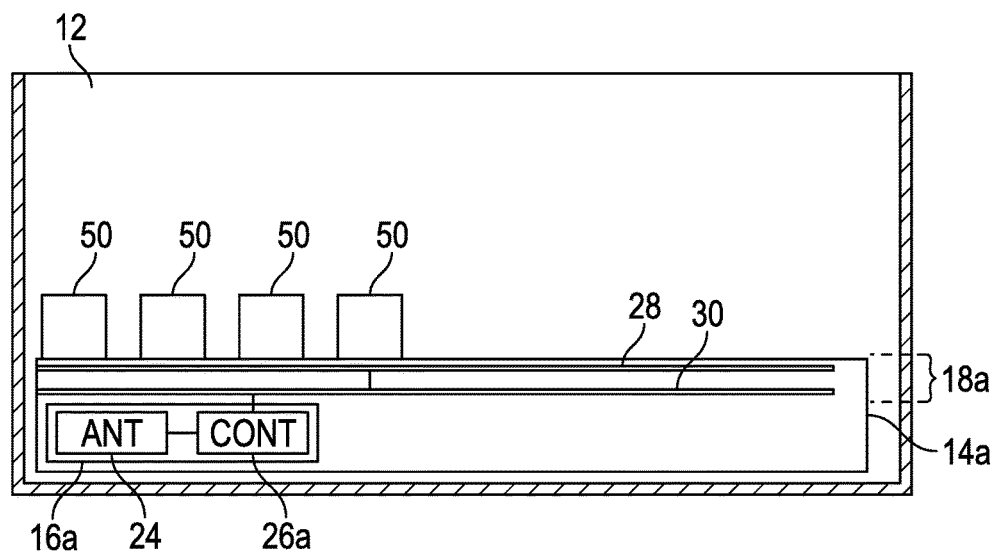
FIG. 3 is a schematic side view of one embodiment of the bin of FIG. 2.

FIG. 3 is a schematic side view (not to scale) of one of the bins 12 with a sensor module 14a having a first type of sensor 18a. The RF interface 16a of the sensor module 14a includes an antenna 24 and a controller 26a. The sensor 18a is a simple contact switch including a first conductor 28 and a second conductor 30 that make electrical contact if there are items 50 (or a sufficient number of items 50) on the upper surface of the sensor module 14a, which may be the first conductor 28. The electrical contact between the first conductor 28 and the second conductor 30 is detected by the controller 26a and is reflected in the signal as part of the digital code (e.g. changing one or more bits) transmitted by the controller 26a via the antenna 24 in response to interrogation by the RF reader 20 (FIG. 1). When the bin 12 is empty, or when the number of items 50 remaining in the bin 12 is below a threshold, the electrical contact in the sensor 18a is broken (or closed, depending on the configuration of the sensor 18a), altering the signal (i.e. digital code) sent from the RF interface 16a when interrogated by the RF reader 20.

Figure 4:
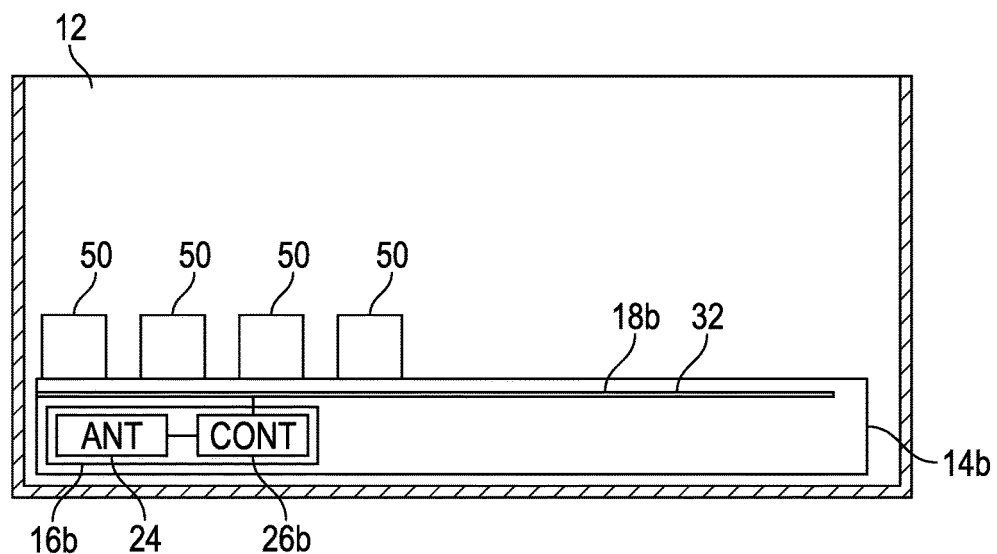
FIG. 4 is a schematic side view of another embodiment of the bin of FIG. 2.

FIG. 4 is a schematic side view (not to scale) of one of the bins 12 with a sensor module 14b having a second type of sensor 18b. The RF interface 16b of the sensor module 14b includes an antenna 24 and a controller 26b. The sensor 18b is a proximity sensor including a sensing antenna 32 that detects the capacitance, conductance or permittivity of the area above it. If there are items 50 (or a sufficient number of items 50) on the upper surface of the sensor module 14b, the capacitance, conductance or permittivity of the items 50 is sensed by the sensor 18b. The sensor module 14b would have to be used with the right types of items 50, whose capacitance, conductance and/or permittivity can be detected by the sensor 18b. The change in capacitance, conductance and/or permittivity is detected by the controller 26b and is reflected in the signal as part of the digital code (e.g. changing one or more bits) transmitted by the controller 26b via the antenna 24 in response to interrogation by the RF reader 20 (FIG. 1).

Figure 5:
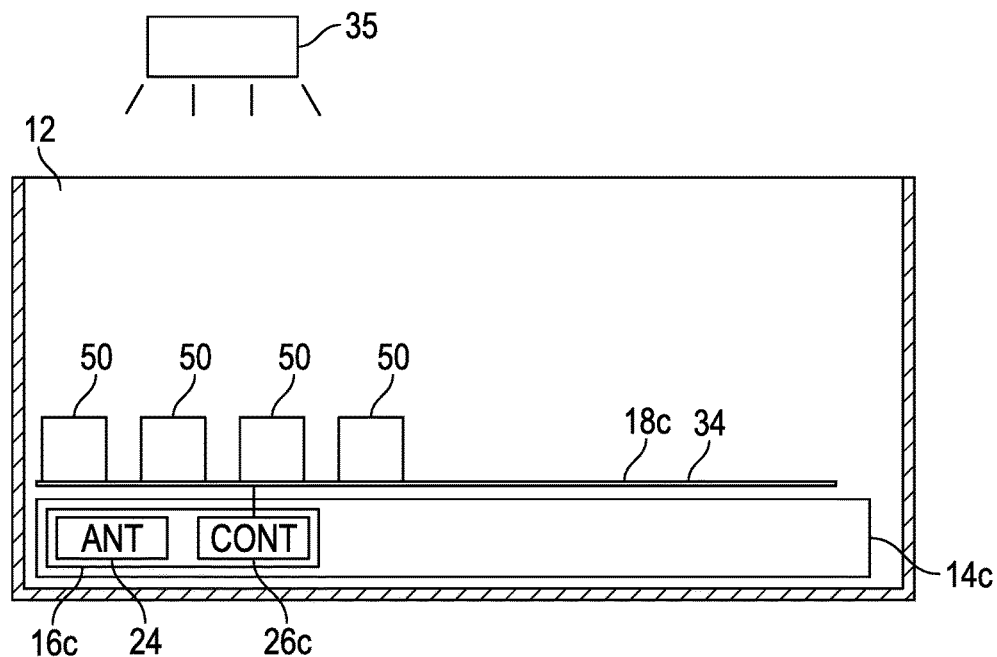
FIG. 5 is a schematic side view of another embodiment of the bin of FIG. 2.

FIG. 5 is a schematic side view (not to scale) of one of the bins 12 with a sensor module 14c having a third type of sensor 18c. The RF interface 16c of the sensor module 14c includes an antenna 24 and a controller 26c. The sensor 18c is a photovoltaic cell 34 that generates electricity when exposed to light, such as an ordinary light source 35 for the supply room 21 (FIG. 1) or for the cabinet or the shelf on which the bin 12 sits, or a dedicated light source inside the bins 12. The light source could be visible or invisible light. When enough items 50 (or all the items 50) are removed from the upper surface of the sensor module 14c, the voltage, current or resistance of the sensor 18c will change more than a threshold. This change relative to the threshold is detected by the controller 26c and is reflected in the signal as part of the digital code (e.g. changing one or more bits) transmitted by the controller 26c via the antenna 24 in response to interrogation by the RF reader 20 (FIG. 1).

Figure 6:
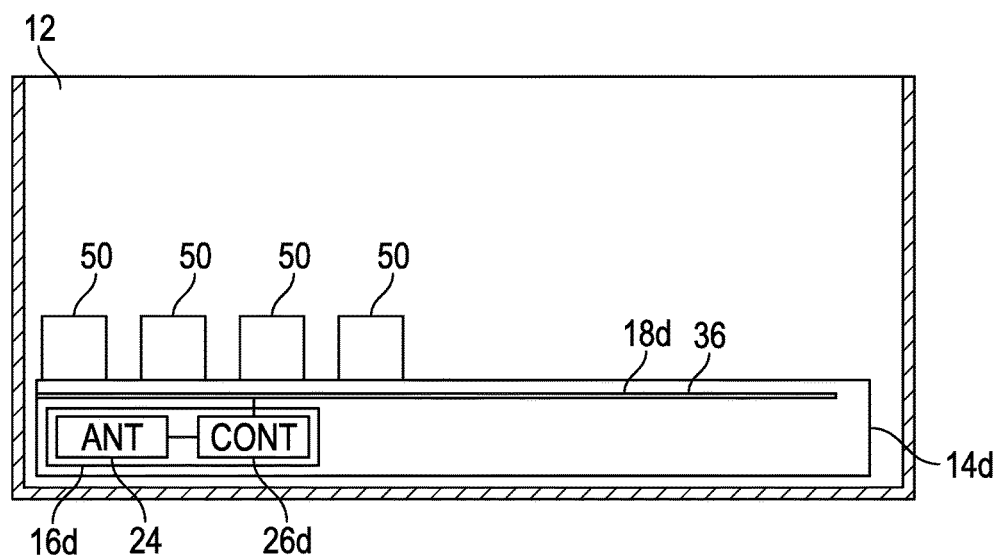
FIG. 6 is a schematic side view of another embodiment of the bin of FIG. 2.

FIG. 6 is a schematic side view (not to scale) of one of the bins 12 with a sensor module 14d having a fourth type of sensor 18d. The RF interface 16d of the sensor module 14d includes an antenna 24 and a controller 26d. The sensor 18d is a magnetic sensor (including a magnet generating a magnetic field in the bin 12) that detects the presence of magnetic objects above it (that is, the objects 50 are magnetic in that they are attracted by a magnet). The magnetic sensor 18d may be a passive magnet that opens or closes a switch when drawn toward magnetic items 50 on the sensor module 14d. If there are items 50 (or a sufficient number of items 50) on the upper surface of the sensor module 14d, the presence of the items 50 is sensed by the sensor module 14d. The sensor module 14d would have to be used with magnetic items 50, whose presence can be detected by the sensor 18b. When a sufficient number of items 50 are removed (e.g. all of the items 50), the absence of magnetic items 50 is detected by the controller 26d and is reflected in the signal as part of the digital code (e.g. changing one or more bits) transmitted by the controller 26d via the antenna 24 in response to interrogation by the RF reader 20 (FIG. 1).

Figure 7:
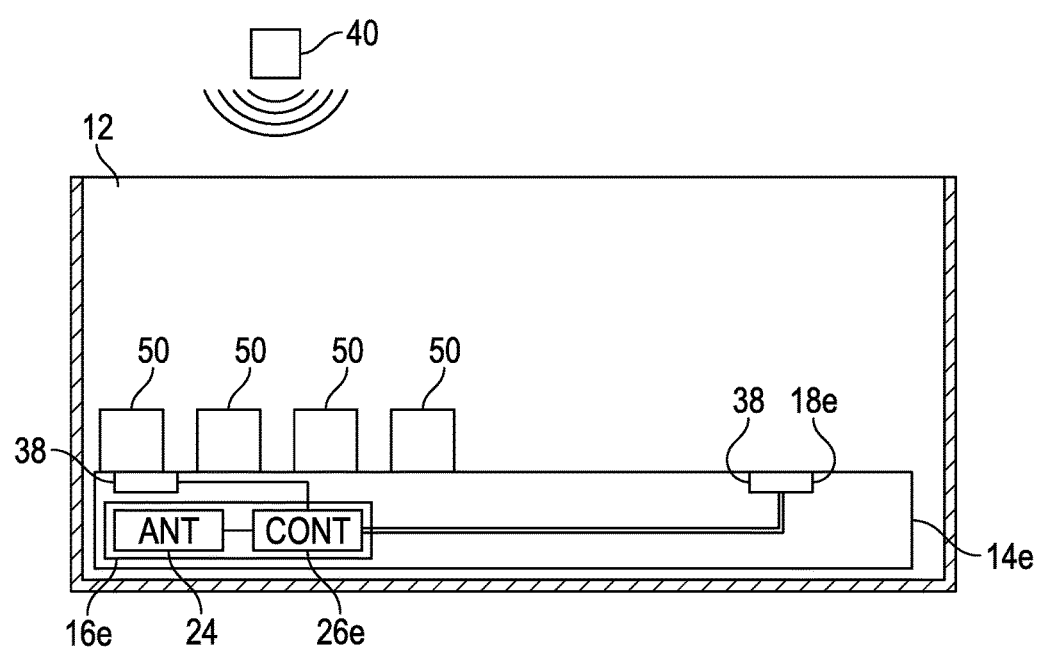
FIG. 7 is a schematic side view of another embodiment of the bin of FIG. 2.

FIG. 7 is a schematic side view (not to scale) of one of the bins 12 with a sensor module 14e having a fifth type of sensor 18e. The RF interface 16e of the sensor module 14e includes an antenna 24 and a controller 26e. The sensor 18e is one or more acoustic transducers 38 (e.g. microphones) that generate an electrical response when receiving acoustic energy, such as sound, which may be ambient sound in the supply room 21 (FIG. 1) or sound from a dedicated acoustic wave generator 40 in the room 21 (or in a cabinet in which a plurality of bins 12 are stored). When there are items 50 in the bin 12, the items 50 absorb and block the acoustic waves entering the bin 12 from reaching the acoustic transducers 38. When enough of the items 50 have been removed from the upper surface of the sensor module 14e, the electrical signals from the acoustic transducers 38 change more than a threshold. This change in is detected by the controller 26e and is reflected in the signal as part of the digital code (e.g. changing one or more bits) transmitted by the controller 26e via the antenna 24 in response to interrogation by the RF reader 20 (FIG. 1). Depending upon the type of items 50 in the bin 12, the signals from the acoustic transducers 38 may either be summed or compared (if one might be uncovered before the other).

Any of the sensor modules 14a-e could be used in the system 10 of FIG. 1. The system 10 thus operates as a bin based supply system without the need for human intervention in requesting replenishment. This improves the reliability of the system 10. The system 10 could still be a two-bin system or multi-bin system (which could be more than two bins per item type), in which two or more bins 12 contain a certain supply item and users draw from one bin 12 first. When the first bin 12 is empty, the inventory system 22 is notified by the sensor module 14 (via RF reader 20) and replenishment is initiated. In the meantime, users draw from the second bin 12 to obtain that supply. The second bin 12 may also have a sensor module 14 in which case if both bins 12 of the two-bin system indicate a lack of items 50, the inventory system 22 (having been notified by both bins 12) initiates a replenishment at a higher priority. If there are more than two bins 12, the additional bins 12 could also include sensor modules 14, and the indication that each succeeding bin 12 is empty raises the priority of replenishment. Within a single supply room, the bins 12 could have sensor modules 14 of different types, including the several types described above or even additional types, which could depend upon the particular supply item 50 stored in each set of bins 12.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A supply bin comprising:
   a bottom wall; and
   a peripheral wall extending upward from the bottom wall to define a bin interior;
   a sensor module in the bin interior, the sensor module including an RF interface capable of providing wireless communication and a sensor capable of detecting a quantity of items in the bin interior, the sensor capable of communicating only whether or not the quantity of items is below a threshold via the RF interface.

2. The supply bin of claim 1 wherein the sensor includes a contact switch.

3. The supply bin of claim 2 in combination with an RFID reader capable of reading the RF interface to determine the quantity of items detected by the sensor in the bin interior, wherein the RFID reader is remote from the supply bin.

4. The supply bin and RFID reader of claim 3, wherein the supply bin is one of a plurality of supply bins in a supply room being interrogated by the RFID reader.

5. The supply bins and RFID reader of claim 4 further including a computer capable of receiving inventory information from a plurality of RFID readers including the RFID reader, in a plurality of supply rooms including the supply room.

6. The supply bin of claim 1 wherein the sensor includes a pressure switch.

7. The supply bin of claim 6 wherein the supply bin is one of a plurality of supply bins in one of a plurality of supply rooms each containing a plurality of the supply bins, each supply room including an RFID reader capable of reading the RF interface in the plurality of supply bins to determine the presence or absence of items detected by the sensor in the bin interior of each of the plurality of supply bins, further in combination with a computer configured to receive inventory information from the RFID readers indicating the presence or absence of items in the plurality of supply bins.

8. The supply bin of claim 1 wherein the sensor includes a capacitance sensor.

9. The supply bin of claim 8 wherein the supply bin is one of a plurality of supply bins in one of a plurality of supply rooms each containing a plurality of the supply bins, each supply room including an RFID reader capable of reading the RF interface in each of the plurality of supply bins to determine the presence or absence of items detected by the sensor in the bin interior of each of the plurality of supply bins, further in combination with a computer configured to receive inventory information from the RFID readers indicating the presence or absence of items in the plurality of supply bins.

10. The supply bin of claim 1 wherein the sensor includes a photovoltaic cell.

11. The supply bin of claim 10 in combination with an RFID reader capable of reading the RF interface to determine the quantity of items detected by the sensor in the bin interior.

12. The supply bin and RFID reader of claim 11, wherein the supply bin is one of a plurality of supply bins in a supply room being interrogated by the RFID reader.

13. The supply bin and RFID reader of claim 12, and further in combination with a light source in the supply room, the photovoltaic cell configured to detect light from the light source in the event the quantity of items in the associated supply bin drops below the threshold.

14. The supply bins and RFID reader of claim 13 further including a computer capable of receiving inventory information from a plurality of RFID readers including the RFID reader, in a plurality of supply rooms including the supply room.

15. The supply bin of claim 1 in combination with an RFID reader capable of reading the RF interface to determine the quantity of items detected by the sensor in the bin interior, wherein the RFID reader is remote from the supply bin.

16. The supply bin and RFID reader of claim 15, wherein the supply bin is one of a plurality of supply bins in a supply room being interrogated by the RFID reader.

17. The supply bins and RFID reader of claim 16 further including a computer capable of receiving inventory information from a plurality of RFID readers including the RFID reader, in a plurality of supply rooms including the supply room.

18. The supply bin of claim 1 wherein the sensor includes a magnetic sensor.

19. The supply bin of claim 18 wherein the supply bin is one of a plurality of supply bins in one of a plurality of supply rooms each containing a plurality of the supply bins, each supply room including an RFID reader capable of reading the RF interface in each of the plurality of supply bins to determine the presence or absence of items detected by the sensor in the bin interior of each of the plurality of supply bins, further in combination with a computer configured to receive inventory information from the RFID readers indicating the presence or absence of items in the plurality of supply bins.

20. The supply bin of claim 1 wherein the RF interface is a passive RF interface.

21. The supply bin of claim 1 wherein the RF interface is a passive RFID tag.

22. A method for managing inventory including the steps of:
   a) associating each of a plurality of RFID interfaces with one of a plurality of supply bins in a supply room;
   b) associating a sensor with each of the plurality of supply bins and the associated RFID interfaces;
   c) placing supplies in the plurality of supply bins;
   d) detecting with one of the sensors that the associated one of the supply bins has less than a threshold of supplies; and
   e) receiving at an RF reader a passive RF signal from the one of the sensors indicating that the associated one of the supply bins has less than the threshold of supplies.

23. The method of claim 22 wherein said step d) includes detecting a change in a contact switch.

24. The method of claim 22 wherein said step d) includes detecting a level of light in the one of the supply bins.

* * * * *